United States Patent
Beavers et al.

(10) Patent No.: US 7,018,163 B2
(45) Date of Patent: Mar. 28, 2006

(54) SYSTEM, APPARATUS, AND METHOD FOR MANIPULATING A STACK OF PAPER, CARDBOARD, AND THE LIKE

(75) Inventors: Joe Curtis Beavers, Beaumont, TX (US); Joshua A. Jaetzold, Groves, TX (US)

(73) Assignee: Sage Automation, Inc., Beaumont, TX (US)

( * ) Notice: Subject to any disclaimer, the term of this patent is extended or adjusted under 35 U.S.C. 154(b) by 215 days.

(21) Appl. No.: 10/447,533

(22) Filed: May 29, 2003

(65) Prior Publication Data

US 2004/0240979 A1    Dec. 2, 2004

(51) Int. Cl.
*B65H 15/02* (2006.01)

(52) U.S. Cl. .................... 414/772; 414/744; 414/790.2
(58) Field of Classification Search ................ 414/772, 414/774, 779, 788.5, 790.2; 294/116, 116.1
See application file for complete search history.

(56) References Cited

U.S. PATENT DOCUMENTS

| | | | | | |
|---|---|---|---|---|---|
| 2,782,065 | A | * | 2/1957 | Lord | 294/119.1 |
| 4,178,119 | A | * | 12/1979 | Busch | 414/788 |
| 4,185,944 | A | * | 1/1980 | Seaberg | 414/621 |
| 5,039,081 | A | * | 8/1991 | Shill | 414/790.2 |
| 5,209,629 | A | * | 5/1993 | Rasmussen | 414/772 |
| 5,294,220 | A | | 3/1994 | Ohmstede et al. | |
| 5,383,760 | A | | 1/1995 | Cawley et al. | |
| 5,388,913 | A | | 2/1995 | Cawley et al. | |
| 5,391,050 | A | * | 2/1995 | Gatteschi | 414/796 |

(Continued)

OTHER PUBLICATIONS

Sage Automation, Inc. "Got A Hot Project" brochure for custom robot systems and material handling equipment; C. 2002.

(Continued)

*Primary Examiner*—Khoi H. Tran
(74) *Attorney, Agent, or Firm*—Fulbright & Jaworski LLP

(57) ABSTRACT

A system is provided for qualifying a stack of generally flat, paper, cardboard, and the like. The system includes a robotic mechanism having a plurality of joints that provide varying degrees of motion and a robotic implement attachable to the robotic mechanism. The robotic mechanism is operable to articulate the robotic implement through various degrees of angular and linear motion. The robotic implement includes a first support barrier, a second support barrier disposed in generally parallel relation with the first support barrier, and a third support barrier extending between the first and second support barriers and connecting the first and second support barriers therewith. Together, the first, second and third support barriers form an open cross-section that defines a bay for supporting the stack. The cross-section includes an open side opposite the third support barrier for receiving an unqualified stack and dispensing a qualified stack. The system further includes a qualifying frame having an overhead generally horizontal wall for qualifying a first side of the stack, a first generally vertical wall, and a moveable second generally vertical wall disposed opposite the first vertical wall. The second vertical wall is moveable in the direction of the first vertical wall to qualify a second side of the stack adjacent the first side. The horizontal wall, first vertical wall, and second vertical wall further define a qualifying zone of the frame that is configured to receive the robotic implement and the unqualified stack. The robotic implement may be moved vertically within the qualifying zone to qualify the first side by engaging the stack with the horizontal wall. Further, the second vertical wall may be moved to engage the stack within the qualifying zone and to qualify the second side of the stack, thereby qualifying the stack.

17 Claims, 11 Drawing Sheets

U.S. PATENT DOCUMENTS

| | | | |
|---|---|---|---|
| 5,484,256 A | * | 1/1996 | Claassen .................. 414/790.8 |
| 5,632,590 A | | 5/1997 | Pearson et al. |
| 5,641,155 A | | 6/1997 | Bridges |
| 5,647,725 A | * | 7/1997 | Kraus et al. ................ 414/799 |
| 5,664,931 A | | 9/1997 | Brugger et al. |
| 5,743,374 A | | 4/1998 | Monsees |
| 5,785,482 A | * | 7/1998 | Tanaka ....................... 414/270 |
| 6,082,797 A | * | 7/2000 | Antonette ................ 294/103.1 |
| 6,105,952 A | | 8/2000 | Helmstadter et al. |

OTHER PUBLICATIONS

FANUC Robotics brochure for "R-2000iA" model; C. 2002.

* cited by examiner

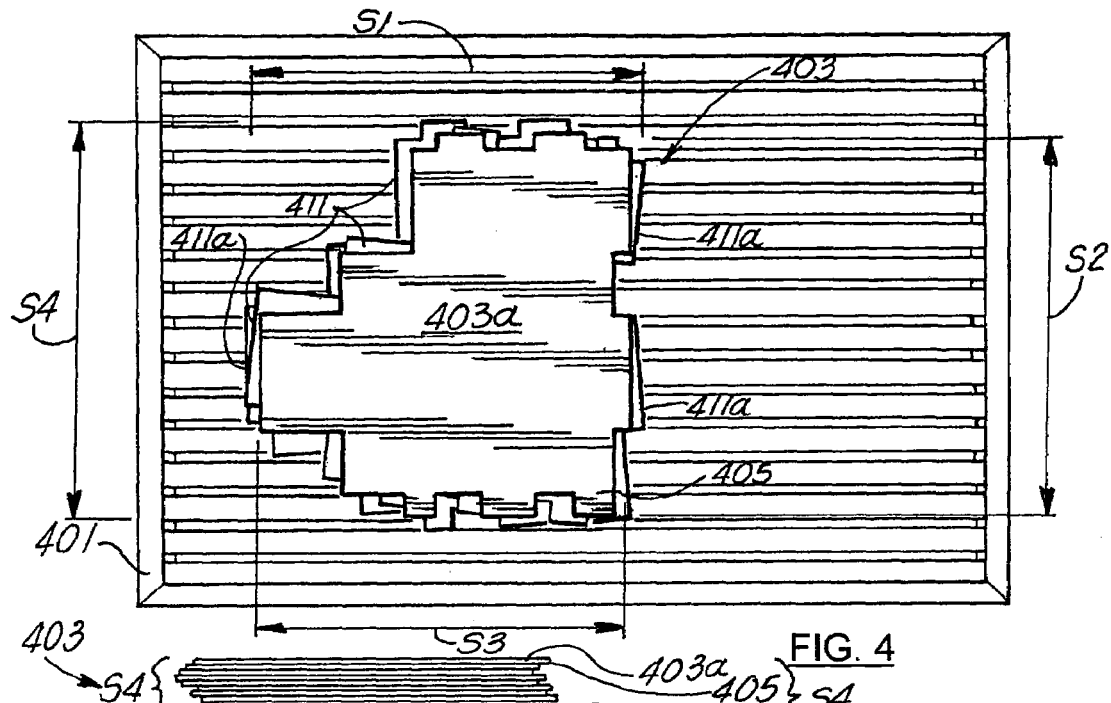
FIG. 4
FIG. 4A
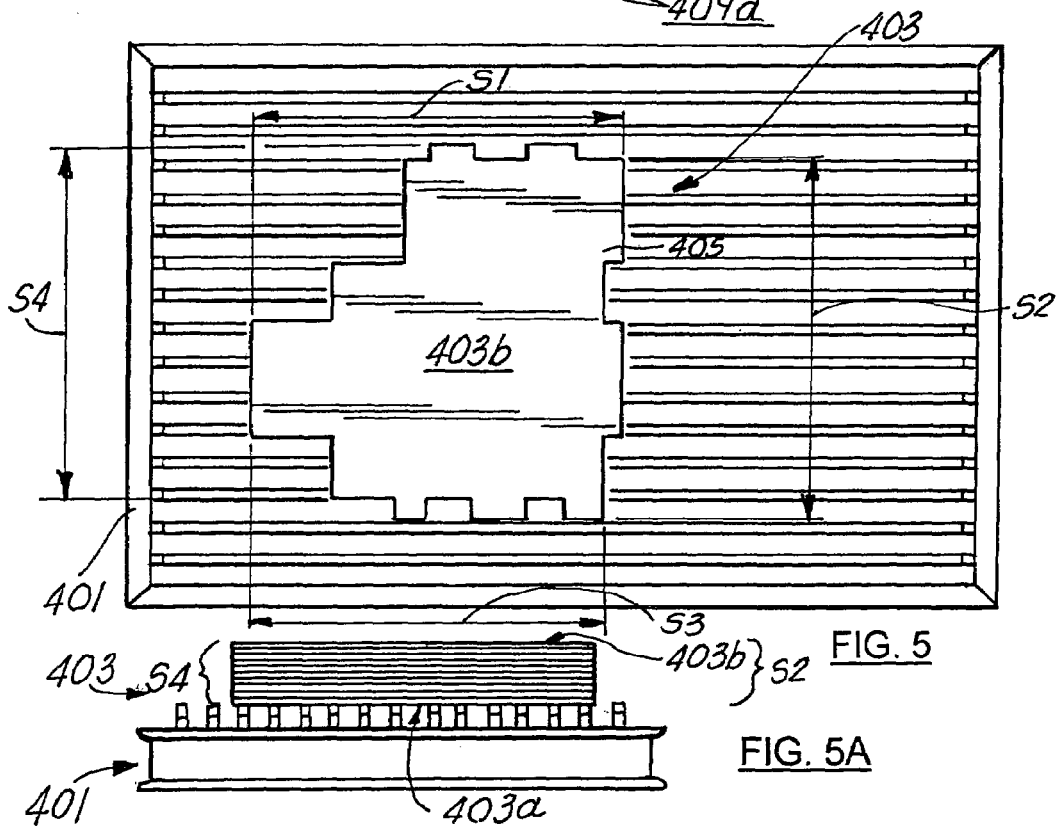
FIG. 5
FIG. 5A

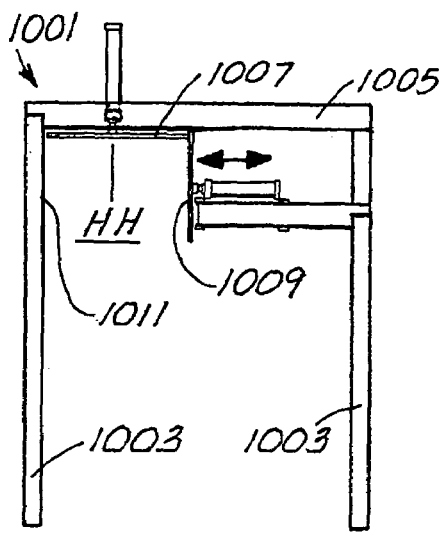
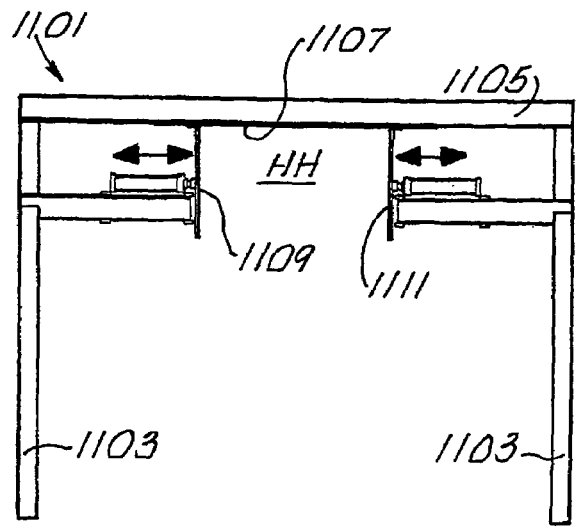
FIG. 10
FIG. 11
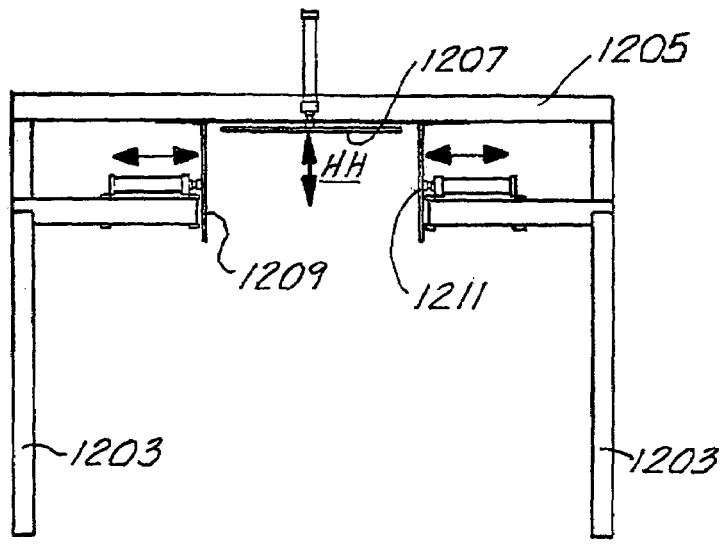
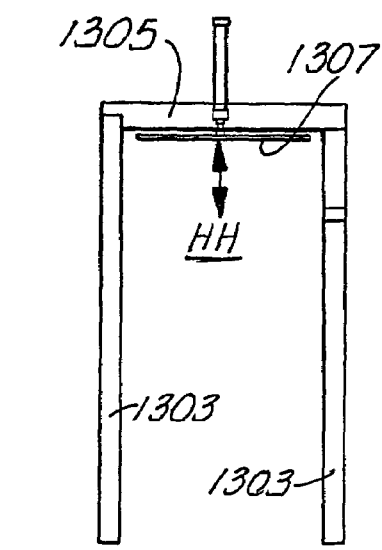
FIG. 12
FIG. 13
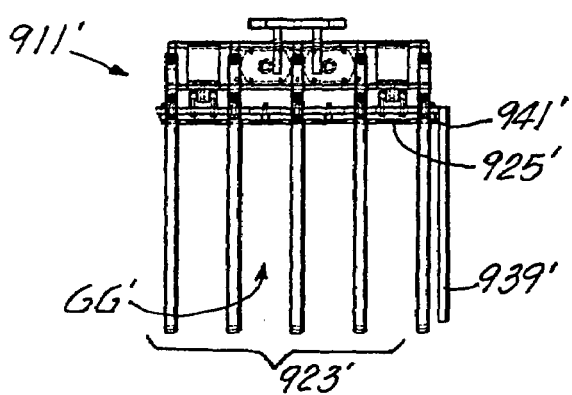
FIG. 9A

SYSTEM, APPARATUS, AND METHOD FOR MANIPULATING A STACK OF PAPER, CARDBOARD, AND THE LIKE

BACKGROUND OF THE INVENTION

The present invention relates generally to a system, apparatus, and method for manipulating or otherwise handling a stack of generally flat items such as paper, cardboard, and the like. More particularly, the invention relates to such a system, apparatus, and method for manipulating the stack with the aid of or by utilizing a robotic mechanism.

Robotic mechanisms are used in a variety of industrial and commercial applications, including material handling processes. For example, robotic mechanisms are employed to move and store materials during various stages of production. Other applications include parts transfers, machine tending, packaging, and palletizing.

In a typical material handling application, a robotic mechanism is equipped with a robotic implement or end effector mounted thereto for handling particular items. For example, U.S. Pat. No. 5,664,931 describes an end effector mounted on a robot frame particularly suited for handling a stack of flattened un-erected carton blanks. The end effector is used to transfer stacks of the carton blanks from a tray or tote to another station in the material handling assembly. These end effectors are specially equipped with abutment members that contact only the edges of the carton blanks during transfer of the blanks.

In U.S. Pat. No. 5,632,590, another robotic implement or end effector is disclosed as being particularly adapted for picking up flat or curved glass panels from glass racks and placing the glass panels into irregularly shaped wooden crates. U.S. Pat. No. 5,387,06 describes another end effector for mounting to a robotic arm. This end effector is also particularly adapted for transferring flat or curved glass panels from a rack and placing the glass panels into irregularly shaped wooden crates. In one application, the end effector is equipped with suction devices for engaging the glass panels.

BRIEF SUMMARY OF THE INVENTION

The present invention relates generally to a system, apparatus, and method for manipulating or otherwise handling a stack of generally, flat items such as paper, cardboard, and the like. More particularly, the invention is related to a method of qualifying the stack with the aid of or by utilizing a robotic mechanism. Even more particularly, the inventive system, apparatus, and method are directed to qualifying stacks of generally flat items prior to an upstream operation, e.g., such as feeding the stacks into a gluer.

As used herein, the term "qualifying a side" means a process of arranging one side (as opposed to a top or bottom surface) of a stack in a predetermined manner. Preferably, this predetermined arrangement requires that the edges (of the generally, flat items) on one side of the stack are substantially aligned, and in most applications, that the side is generally vertically plumb, i.e., forms a generally vertical wall (aligned at about 90 degrees). "Qualifying a stack" according to the inventive method requires that two adjacent sides of the stack be qualified. The method of qualifying a stack or side and the terms used in describing the method are further discussed below.

In one aspect of the invention, a method is provided for manipulating a stack of generally flat items such as paper, cartons, and the like. The method includes the step of providing a robotic implement having a containment bay for receiving and supporting a stack of generally flat items. The containment bay is defined by first support barrier (e.g., a first multi-prong fork), a second support barrier (e.g., a second multi-prong fork) disposed in spaced apart relation (preferably, generally parallel relation) with the first support barrier, and a third support barrier (e.g., a floor or base of the robotic implement) extending between the first and second support barriers and preferably connecting therewith. The containment bay also has an open end section that is disposed opposite the third support barrier. The robotic implement is mounted on a robotic mechanism, such that the robotic mechanism can articulate the robotic implement through a range of angular and linear motion. The method further includes supporting an unqualified stack of the generally flat items within the containment bay of the robotic implement, whereby a first side of the stack is positioned closest to the third support barrier.

In accordance with the inventive method, the unqualified stack is qualified by qualifying at least two adjacent sides of the stack. A first side of the stack is qualified by operating the robotic implement so as to force all of the generally flat items of the stack to move toward the third support barrier and to align the first side of the stack against the third support barrier. Preferably, the robotic implement is first positioned below a generally horizontal wall such that the open section end is closest to the horizontal wall and the first side of the stack rests on the third support barrier. Then, the robotic implement is raised to engage the stack with the horizontal wall, thereby pressing the stack against the third support barrier and aligning the first side against the third support barrier.

In other applications, this qualifying step involves positioning the robotic implement such that the stack is disposed in generally horizontally and then rotating the robotic implement toward a generally vertical orientation. In this way, the stack falls (i.e., due to gravitational force) against the third support barrier, thereby qualifying the first side of the stack. In another application, the stack is first secured within the containment bay (preferably through use of a clamping mechanism of the robotic implement) such that the first side of the stack is spaced from the third support barrier. The qualifying step then involves positioning the robotic implement such that the stack is disposed generally vertically and operating the robotic implement to release the stack (e.g., disengaging the clamping mechanism) so that the generally flat items fall to the third support barrier, thereby qualifying the first side of the stack.

The inventive method also calls for qualifying at least a second side of the stack that is adjacent the first side. This entails positioning the unqualified stack in between and in general alignment with a moveable first vertical wall and a second vertical wall and then, moving the moveable vertical wall to engage the second side of the unqualified stack. In doing so, the stack is pressed between the first and second generally vertical walls, thereby qualifying at least a second side of the stack. Preferably, this moving step is performed a plurality of times.

Alternatively, the step of qualifying a second side (or first side) of the stack may include forcing the generally flat items of the stack to shift, within the containment bay, toward a qualifying wall positioned aside or outside of one side of the first and second support barriers. In this way, the second side of the stack aligns against the qualifying wall and becomes qualified. This qualifying wall may be integrated with or incorporated into the rest of the rotating implement, such that the method includes rotating the robotic implement causes the stack to shift in the second direction (e.g., by gravitational force). In another variation, the robotic implement has a moveable wall positioned on the other side of the first and second support barriers from the qualifying wall. The method then calls for moving the moveable wall to engage the stack in the containment bay so as to force the stack to shift toward the qualifying wall, thereby aligning the second side against the qualifying wall.

In another aspect of the invention, an implement is provided for attachment to a robotic mechanism such as a robotic arm, and for qualifying stacks of generally flat items such as paper, cardboard, and the like. This robotic implement includes a first support barrier in the form of a first multi-prong fork that is adapted for insertion into the grooves of a pallet supporting the stacks. The robotic implement also includes a second support barrier in the form of a second multi-prong fork disposed in spaced apart relation with the first fork. The second fork is preferably disposed in generally parallel relation with the first fork and adapted for insertion into the grooves of a pallet supporting the stack. Further, the robotic implement has a third support barrier that extends between the first and second support barriers and connects the first and second support barriers therewith. As such, the first, second, and third support barriers define a containment bay for receiving and supporting a stack of generally flat items. The containment bay has an open end section across from the third support barrier.

Preferably, the first support barrier is moveable toward the second support barrier to secure a stack in the containment bay. Further, the robotic implement may include a clamping mechanism operatively associated with the first support barrier and operable to move the first support barrier.

In yet another aspect of the invention, a system is provided for qualifying a stack of generally flat, paper, cardboard, and the like. The stack is generally characterized by four sides or faces. The system includes a robotic mechanism having a plurality of joints that provide a range of angular motion and a robotic implement or end effector attachable to the robotic mechanism. The robotic mechanism is operable to articulate the robotic implement through a range of angular and linear motion. The robotic implement includes a containment bay for receiving and supporting the stack. The containment bay is defined by a first support barrier (e.g., a first fork), a second support barrier (e.g., a second fork) disposed in spaced part relation with the first support barrier, and a third support barrier (e,g., floor or base of the robotic implement) extending generally between the first and second support barriers. The containment bay also includes an open end section disposed across from the third support barrier.

The inventive system further includes a qualifying frame having a generally horizontal wall for qualifying a first side of the stack, a first generally vertical wall, and a moveable second generally vertical wall disposed opposite the first vertical wall. The second vertical wall is moveable in the direction of the first vertical wall to qualify a second side of the stack adjacent the first side. The horizontal wall, first vertical wall, and second vertical wall further define a qualifying zone of the frame that is configured to receive the robotic implement and the unqualified stack. The robotic implement may be moved vertically within the qualifying zone to qualify the first side by engaging the stack with the horizontal wall. Further, the second vertical wall may be moved to engage the stack within the qualifying zone and to qualify the second side of the stack, thereby qualifying the stack.

BRIEF DESCRIPTION OF THE DRAWINGS

FIG. 4 is a plan view of the unqualified stack;

FIG. 4A is an elevation end view of the unqualified stack of FIG. 4;

FIG. 5 is a plan view of a stack qualified and inverted according to the inventive method;

FIG. 5A is an elevation end view of the stack of FIG. 5;

FIG. 9A is yet another alternative robotic implement according to the present invention;

FIG. 10 is a simplified elevation view of an alternative qualifying frame according to the invention;

FIG. 11 is a simplified elevation view of another alternative qualifying frame according to the invention;

FIG. 12 is yet another alternative qualifying frame according to the present invention; and FIG. 13 is yet another alternative qualifying frame according to the invention.

DETAILED DESCRIPTION OF THE DRAWINGS

Figure 1:
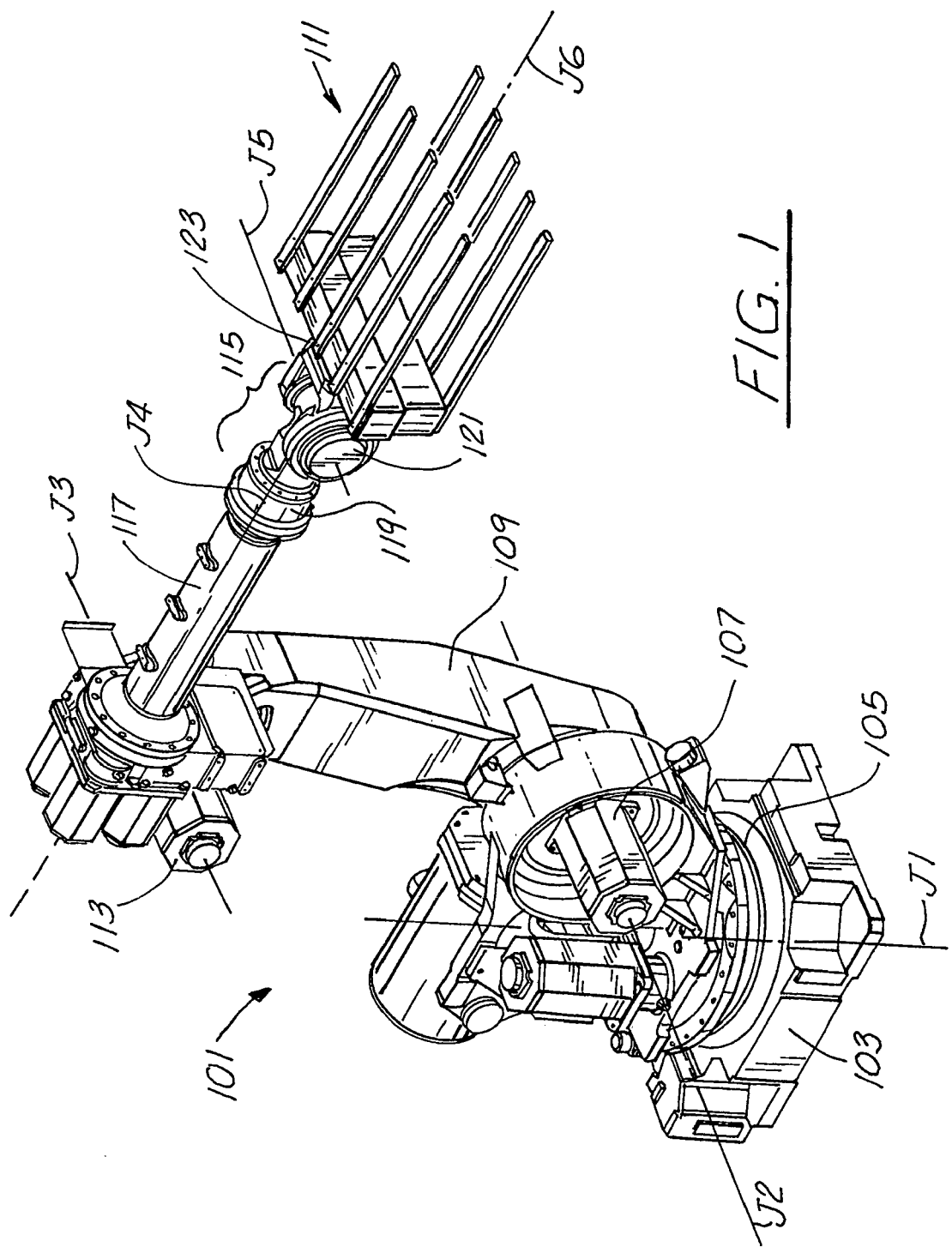
FIG. 1 is a perspective view of a robotic mechanism according to the present invention.

FIGS. 1–13 depict various components of a system and apparatus for manipulating a load with the aid of a robotic mechanism, each of which embodies various aspects of the present invention. The system and apparatus are particularly adapted to manipulating a stack of generally flat items such as paper, cardboard, and the like. FIG. 1 depicts a fully equipped robotic mechanism 101 having an attachable implement 111 for manipulating such a stack. In one respect, the robotic mechanism 101, including the robotic implement 111, may be referred to as a system for manipulating such a stack in accordance with the present invention. In yet another aspect of the invention, the robotic implement 111 according to the invention incorporates certain features and structures which make it particularly suitable for qualifying and/or inverting a stack of generally flat, uniformly configured items such as paper, cardboard, and the like. The figures are also provided to illustrate a method of manipulating, e.g., qualifying or inverting, a stack of generally flat, uniformly-configured items such as paper, cardboard, and the like.

It should first be noted that, upon review of the detailed description and the drawings provided herein, it will become apparent to one of ordinary skill in the material handling, robotics, or other relevant art, that the present invention is also applicable to material handling processes and equipment other than those specifically described herein. For example, a robotic implement or qualifying frame according to the invention may be used with other robotic mechanisms known in the art. Further, the method described herein may be applicable to other objects besides a stack of paper or cardboard. The present invention is not intended to be limited to the structures and methods specifically described and illustrated herein.

The object of the inventive method, as described above, is a stack of "generally flat items such as paper, cardboard, and the like." These stacks may include carton blanks and other generally flat materials that are delivered in quantities, then prepared or presented for a process downstream of the inventive method described herein. Typically, the generally flat materials all have the same shape or configuration. In the simplest form, this configuration is a square or other rectangle having four straight edges. In many applications, however, this configuration is a polygon having more than four edges. Preferably, the inventive method is directed to qualifying such a stack of generally flat, uniformly-configured items.

Now turning to FIG. 1, a robotic mechanism 101 is provided with a robotic implement 111 (sometimes referred to as an end effector) mounted thereto and configured for both qualifying and inverting stacks presented on a surface platform such as a pallet. In the exemplary application illustrated in FIGS. 1–13, the stacks consist of generally flat, uniformly-configured folding carton blanks delivered on conventional pallets as the output of an upstream printing and press process. The operation now requires the carton blanks either held for storage or immediately fed into a gluer hopper. In either event, the gluer hopper in this application requires that the stack is first qualified and inverted. Unqualified stacks can often jam material handling equipment such as gluer hoppers and cause delay in the operation. In the prior art, qualifying of the stacks is typically performed manually.

The robotic mechanism 101 as depicted in FIG. 1 is in the form of an industrial robotic arm 101 having six joints providing six axes of motion. The robotic mechanism 101 can articulate robotic implement 111 through a full range of angular and linear motion. One robotic arm (minus the inventive robotic implement 111) suitable for use with the inventive system and method is one marketed as the R-2000iA™ by Fanuc Robotics of Rochester Hills, Mich. Robotic controllers suitable for automatic control of robotic mechanism 101 and robotic implement 111 are commercially available in the robotic and controls sectors of the industry.

In addition to six joints 105, 107, 113, 119, 121, 123 the primary components of the robotic arm 101 are a stationary mounting base 103, an upper arm beam 109, a lower arm beam 117, and a wrist assembly 115. Base 103 is likely to be found mounted on a factory floor and in the vicinity of a material handling assembly line or other shop area. As shown in FIG. 1, the base 103 directly supports a fixed main horizontal joint 105 and a main vertical joint 107. The main horizontal joint 105 provides for rotation of the entire robotic arm 101 about a vertical axis J1, while the main vertical joint 107 provides for rotation of the upper arm beam 109 about vertical axis J2. Elbow joint 113 connects upper arm beam 109 with lower arm beam 117 and provides for rotation of lower arm beam 117 relative to upper arm beam 109 (i.e., about axis J3).

Robotic arm 101 is further provided with the first wrist joint 119 and a second wrist joint 121. As shown in FIG. 1, the first wrist joint 119 allows robotic implement 111 to rotate about a longitudinal axis J4 of lower arm beam 117. The second wrist joint 121 allows for robotic implement 111 to rotate relative to lower arm beam 117 about axis J5. Preferably, the third wrist joint is a type of wrist flange located on the outboard side of second wrist joint 121 and directly connected with robotic implement 111. Wrist joint 123 allows for rotation of the robotic implement 111 about a longitudinal axis J6. The axis J6 is coincidental with axis J4 when lower arm beam 117 and wrist assembly 121 are hyper extended, as shown in FIG. 1.

By utilizing various combinations of joints and rotations about these joints, robotic implement 111 may be programmed or otherwise operated to move through a full range of linear and angular motion, as is generally known in the art. As used herein, the term "rotation" or "rotate" encompasses angular motion or pivoting of less than 360° degrees.

As mentioned above, the design of robotic arm 101, minus robotic implement 111, is known in the art. Variations of a robotic mechanism suitable for use with the robotic implement 111 will be apparent to one in the robotic or material handling art, upon reading the present description and/or viewing the accompanying drawings.

Figure 2:
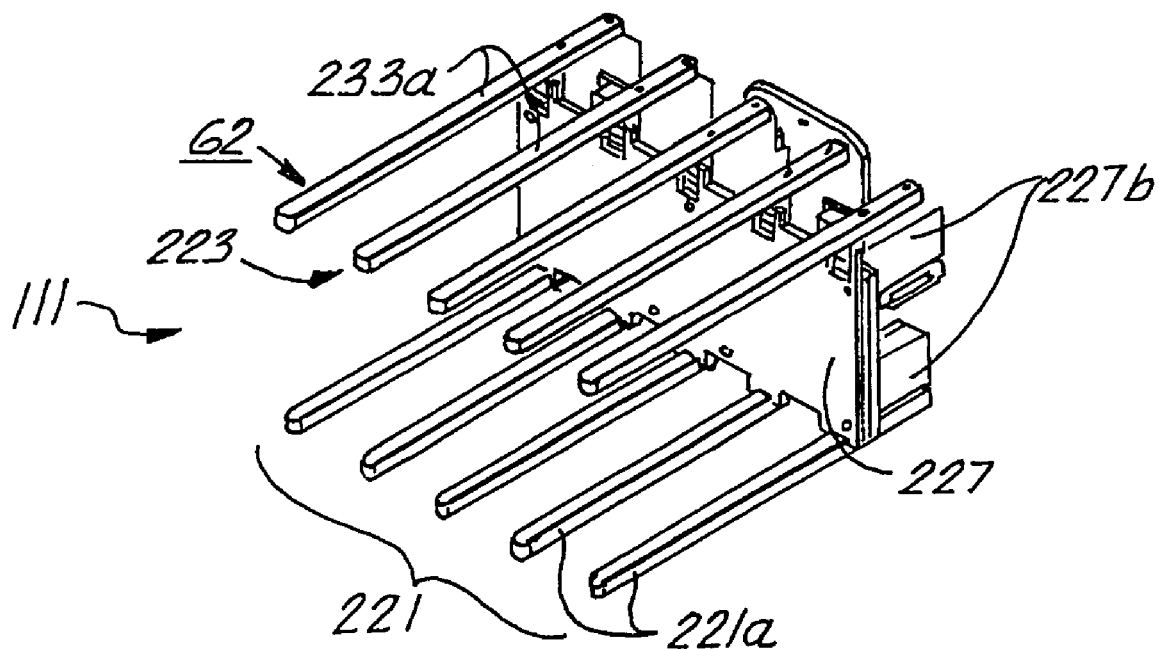
FIG. 2 is a perspective view of a robotic implement suitable for use with the robotic mechanism of FIG. 1, according to the present invention.

Referring to FIG. 2, a robotic implement 111 according to the invention includes at least one multi-prong fork 221 for engaging, supporting, and securing a generally flat stack presented on a pallet or similar support platform. The fork 221 is configured so as to correspond with the grooves or tines of a conventional pallet. More particularly, the prongs 221a of the fork 221 are sized and spaced apart from one another to correspond with the pitch of the grooves and so that the fork 221 can be inserted into the grooves of the pallet (to engage the bottom surface of the stack or other load). This correspondence between the prongs 221a and the pallet grooves is also utilized in the lowering and transferring of a load onto a pallet. Specifically, the prongs 221a can be lowered into the grooves until the top surface of the pallet engages and then supports the load. The forks 221 can then be removed from the pallet.

In one aspect of the invention, the robotic implement 111 preferably includes a corresponding, multi-prong fork 223 disposed in spaced apart relation with the first multi-prong fork 221. The fork 223 corresponds with fork 221 in that the prongs 223a of fork 223 are also sized and spaced part (preferably, in generally parallel relation) to allow fork 223 to be inserted into the grooves of the pallet and to engage a stack or other load thereon. In this way, forks 221 and 223 are interchangeable and either fork 221 or 223 can be used to engage and lift a load from the pallet, as well as to lower and transfer a load onto the pallet. This interchangeability also allows the robotic mechanism 101 and robotic implement 111 to lift a stack from a pallet, invert the stack (usually achieved through a 180° rotation about wrist joint 123), and then set the stack down again on the same or another pallet. In lifting the stack, the first fork 221 is inserted in the pallet grooves and serves as the bottom support. After inversion, the second fork 223 becomes the bottom support and is lowered into the pallet grooves to set the stack onto the second pallet. In applications wherein inversion of the stack is not required, forks 223 may be replaced with a solid wall or barrier. Moreover, in applications wherein the stacks are not presented on a pallet or similar platform, the forks 221, 223 may be replaced with a solid wall or barrier (e.g., a plate). In these applications, the stack of generally flat items may be manually loaded into the robotic implement 101.

Referring again to FIGS. 2 and 2A, robotic implement 111 includes a wall or floor 225 that extends between and, thereby, preferably connects forks 221, 223. A flanged joint connection 227 is provided on the back of the floor 225 and is used to mount the robotic implement 111 on the robotic arm 101. More specifically, flange connection 227 connects directly with wrist joint 123. By positioning the flange connection 227 at the rear rather than the top, the robotic implement 111 can be connected in axial alignment with the lower arm beam 117 and fork 223 is cleared of any potential encumbrances. This allows forks 221 and 223 to be used interchangeably as a bottom support during lifting or lowering. As will be illustrated below, this also allows for the robotic implement 111 to rotate unimpeded in the upward direction (toward lower arm beam 117) by utilizing joint 121. Further, when the robotic implement 111 is disposed in a vertical orientation, it can be rotated up to 180° in the horizontal direction (about longitudinal axis J1 of flange connection 227), through use of wrist joint 123. As a result of these attributes, the robotic implement 111 according to the invention can be used to invert a stack or other load during handling operations.

Figure 2A:
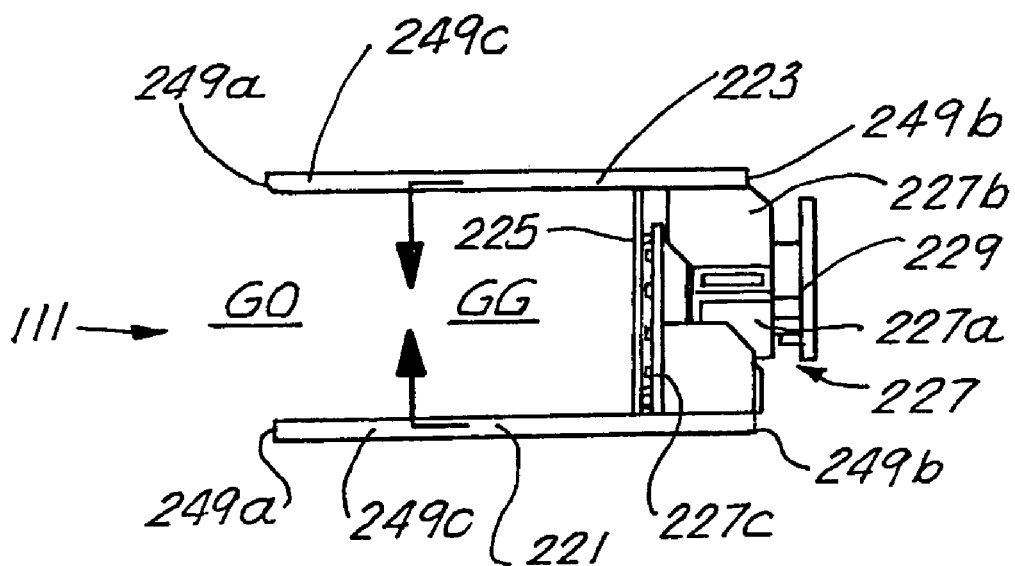
FIG. 2A is a side elevation view of the robotic implement of FIG. 2.

Robotic implement 111 also has a clamping mechanism 227 for moving forks 221, 223 as shown by the arrows in the side view of FIG. 2A. The clamping mechanism 227 is a pneumatically-operated system including a pair of cylinders 227a movable against a pair of driving blocks 227b joined with forks 221, 223. The blocks 227b are movably constrained by one or more tracks or rails 227c. In this embodiment, clamping mechanism 227 provides for vertical movement of both forks 221, 223 to secure a load therebetween. In further embodiments, robotic implement 111 may be provided with a clamping mechanism that allows movement of only one of forks 221, 223.

Referring to the side view of FIG. 2A, the forks 221, 223 and floor 225 define a generally U-shaped containment bay GG wherein a stack or other load may be supported and secured during handling operations. The containment bay GG includes an open end section 60 across from the floor 225 and formed by the gap between forks 221, 223. The robotic implement 111 also includes open side sections G1, G2. As will become evident with the description of the inventive method, the length and width of the forks 221, 223 (and, thus the locations of open sections G0, G1, G2) are advantageously less than the corresponding length and height of the various stacks. In this way, a stack supported within containment bay GG will extend to the side and front of the robotic implement beyond the forks 221, 223. Each of fork 221, fork 223, and floor 225 may be regarded as providing a containment or support barrier for maintaining the stacks within the containment bay GG and within robotic implement 111. In various embodiments, robotic implement 111 may be referred to, generically, as having three containment or support barriers (e.g., forks 221, 223 and floor 225).

For purposes of description, the two forked support barriers 221, 223 may be further referred to as first and second support barriers 221, 223. Each of the first and second support barriers 221, 223 has a front margin 249a near open end section 60, a back margin 249b, and a pair of sides or side margins 249c, 249d (obscured from view) extending between the front margin 249a and back margin 249b.

Figure 3:
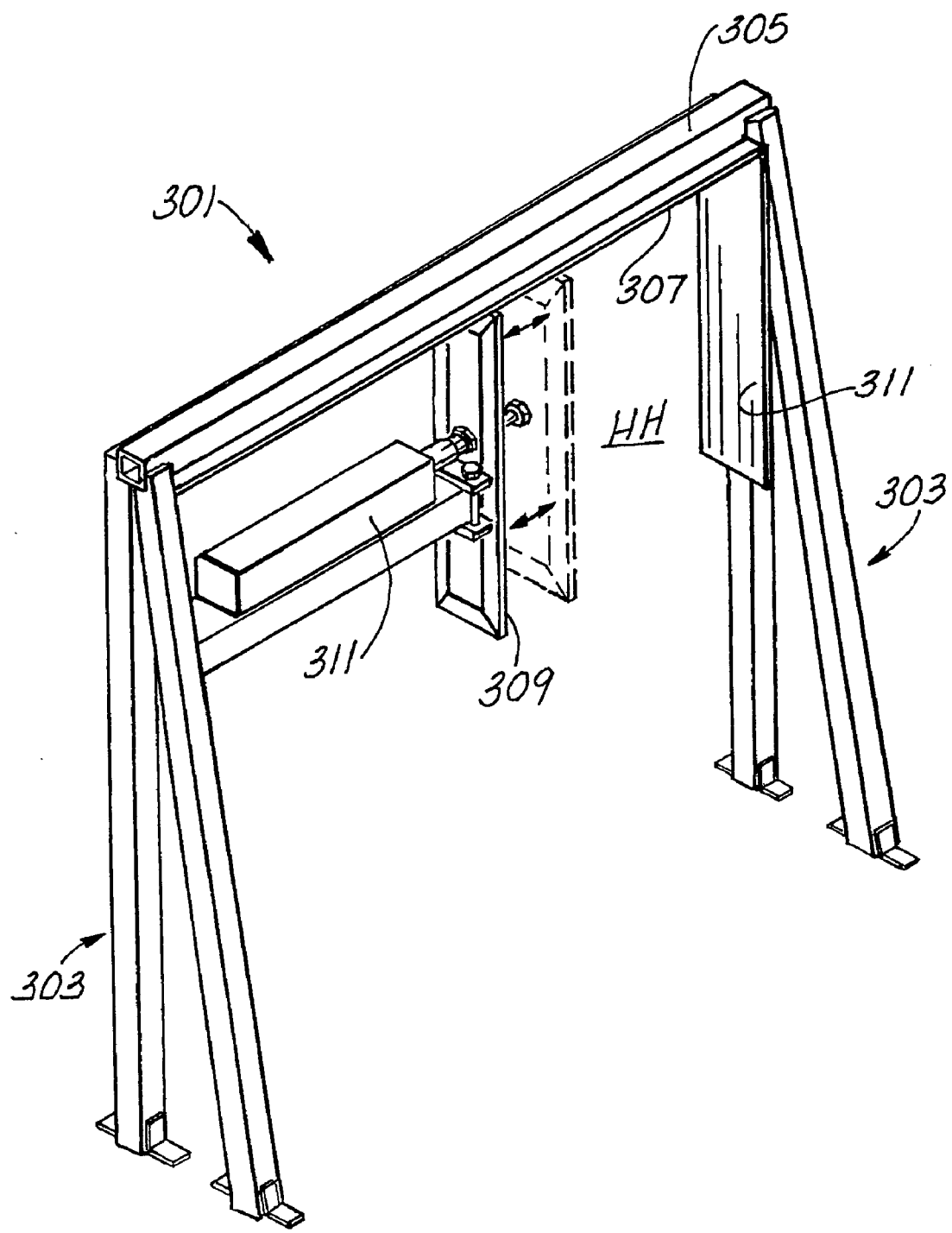
FIG. 3 is a perspective view of a qualifying frame according to the present invention.

In one embodiment of a system for qualifying stacks according to the present invention, a third component of the system is a qualifying frame 301 as depicted in FIG. 3. The qualifying frame 301 is utilized in conjunction with the robotic mechanism 101 and robotic implement 111 to qualify two adjacent sides of the stack (thereby qualifying the stack). The qualifying frame 301 includes a pair of upright supports 303 and an overhead horizontal beam 305 connected therebetween. Moreover, the qualifying frame 301 of FIG. 3 is provided with a least three qualifying walls or plates: a stationary top horizontal wall 307, a moveable vertical wall 309, and a stationary vertical wall 313. The moveable vertical wall 309 is moveable in the horizontal direction and towards and away from stationary vertical wall 313, by way of operation of a conventional cylinder assembly 311 or some other motor mechanism. As will be further described below, the qualifying wall or plates 307, 309, 313 define a qualifying box or region HH. In accordance with the inventive method, an unqualified stack may be transferred into the qualifying box HH and then qualified through operation of a system including robotic mechanism 101, robotic implement 111, and qualifying frame 301.

FIGS. 4 and 4A are a plan view and an elevation end view, respectively, of a typical support platform 401 supporting a stack 403 of generally flat carton blanks 405. The stack 403 has a top surface 403a (provided by the top carton blank 405) and a bottom surface 403b (provided by the bottom carton blank 405). The support platform 401 is in the form of a conventional pallet 401 having a base 401a and an upper support surface provided by a parallel array of tines 407. The tines 407 extend across a width or length of the pallet 401 and are set apart to form grooves 409 therebetween. The grooves 409 provide access ways for forks 221, 223 of the robotic implement 111 to engage bottom surface 403b of an unqualified stack 403 on the pallet 401 or move a qualified stack across or onto the pallet 401. The width of the prongs 221a, 223a is sufficiently smaller than the width of the groove 409 to accommodate movement of the prongs 221a, 223a in and along the grooves 409. Secondly, the height of the prongs 221a, 223a is sufficiently less than the height of the groove 409 to facilitate transfer of a load onto the platform 401. In particular, prongs 221a, 223a may be sunk into the groove 409 when setting a qualified stack onto the pallet 401. As the prongs 221a, 223b lower into the grooves 409, the tines 407 engage the bottom surface of the qualified stack and the stack ultimately rests across the array of tines 407 rather than the fork 221, 223.

The stack 403 of generally flat carton blanks 405 is unqualified in that the polygonal-shaped carton blanks are not aligned along any adjacent two of four sides S1, S2, S3, S4 (See e.g., FIG. 4). Each carton blank 405 has a polygonal configuration that provides a periphery formed by a number of linear edges 411. The edges 411 may be generally grouped together, however, into one of the four sides S1–S4. The boundaries of the four sides S1–S4 are not always well-defined and thus may be generally drawn, as shown in FIG. 4. It should be noted that for each side S1–S4, there is an edge(s) that protrudes outwardly more than the other edges. These outwardly protruding edges provide the surfaces which are engaged during the qualifying method, according to the invention. Referring to FIG. 4, these outwardly protruding edges includes those indicated by reference 411a.

The elevation end view of FIG. 4A further indicates that right and left sides S2, S4 of the stack 403 are not qualified because the individual edges 411 of the carton blanks 405 are not laterally aligned along a vertical plane. It is the object of a method according to the invention to qualify the unqualified stack 403 by qualifying any two adjacent sides, e.g., S1–S2, S2–S3, S3–S4, and/or S4–S1. It should be further noted, however, that qualifying a side does not necessarily mean that the qualified side will be plumb and thus, form a 90 degree vertical plane. It may be desirable, in some applications, that the qualified side is oriented at an angle rather than a vertical, 90 degree plane.

FIGS. 5 and 5A depict a stack 403 of generally flat carton blanks 405 that have been qualified and inverted in accordance with the inventive method. Referring to the elevation end view of FIG. 5A, the side S2 is vertically plumb. FIG. 5 shows further that sides S1 and S3 are also aligned, and thus, only the outline of a single carton blank 405 is observed from the plan view. As discussed below, the qualified stack 403 depicted in FIGS. 5 and 5A has also been inverted so that the original top surface 403a becomes the bottom surface supported on the platform 401, and the original bottom surface 403b is now located atop the stack 403 (see FIG. 5).

FIGS. 6A–6L are now described to illustrate a method of qualifying and inverting stack 403 according to the invention.

Figure 6A:
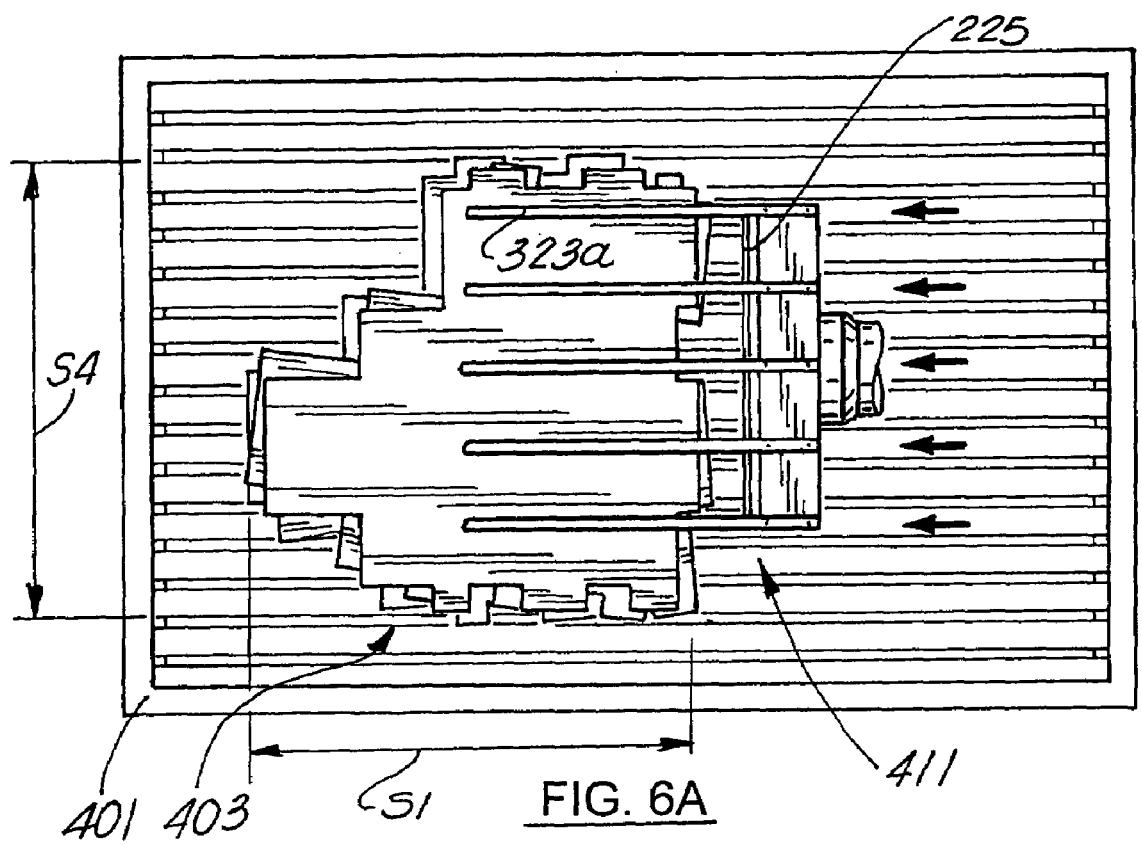
FIGS. 6A–6L are various views illustrating a method of manipulating, including qualifying and inverting, the unqualified stack of FIG. 4, according to the invention.
Figure 6B:
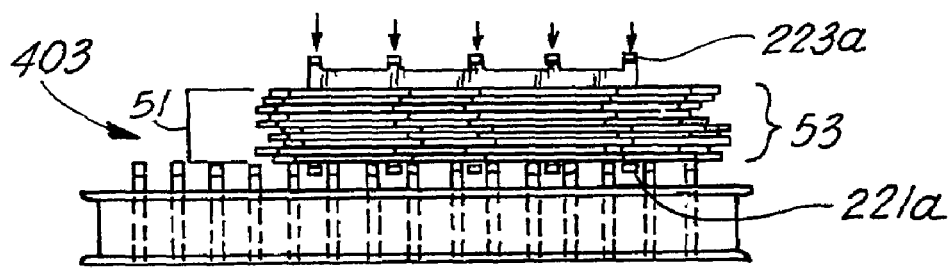

Referring now to the plan view of FIG. 6A, a generally flat stack 403 of carton blanks 405 are provided on pallet 401. The stack 403 is unqualified. In an initial step in the method, the robotic implement 111 is moved to the right of pallet 401 and side S2 of the stack 403, with forks 221, 223 generally spread apart. The robotic implement 11 is lowered into alignment with the grooves 409 and then moved forward toward the stack 403 such that the tines 221a of fork 221 are situated in the grooves 409. In FIG. 6A, robotic implement 111 begins to engage the stack 403, with fork 221 positioned underneath the bottom surface 403b and fork 223 positioned above top surface 403a. At this stage, the stack 403 is positioned within the containment bay GG of robotic implement 111. Accordingly, clamp mechanism 227 is activated so that forks 221, 223 close to secure or clamp unqualified stack 403 in the bay GG (see FIG. 6B).

Figure 6C:
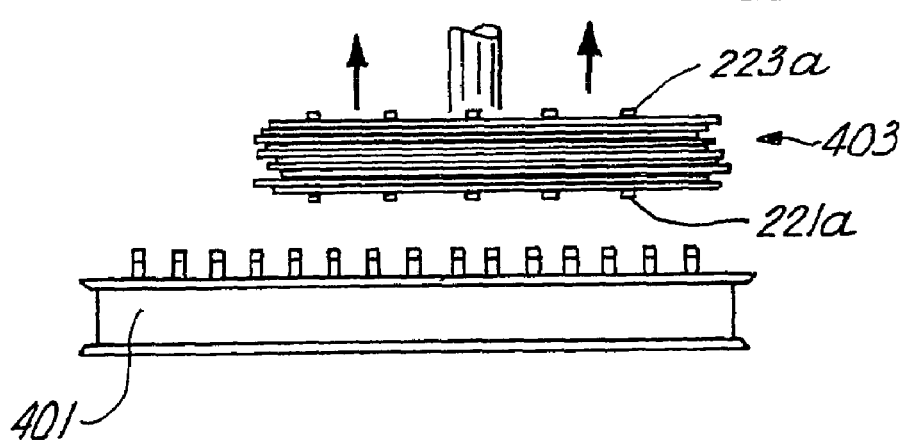
Figure 6D:
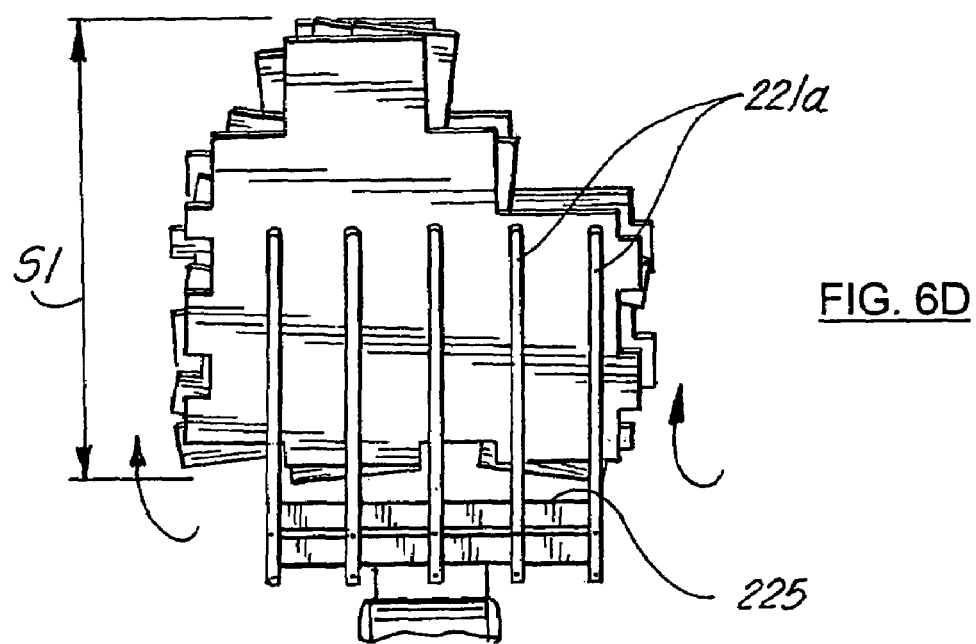
Figure 6E:
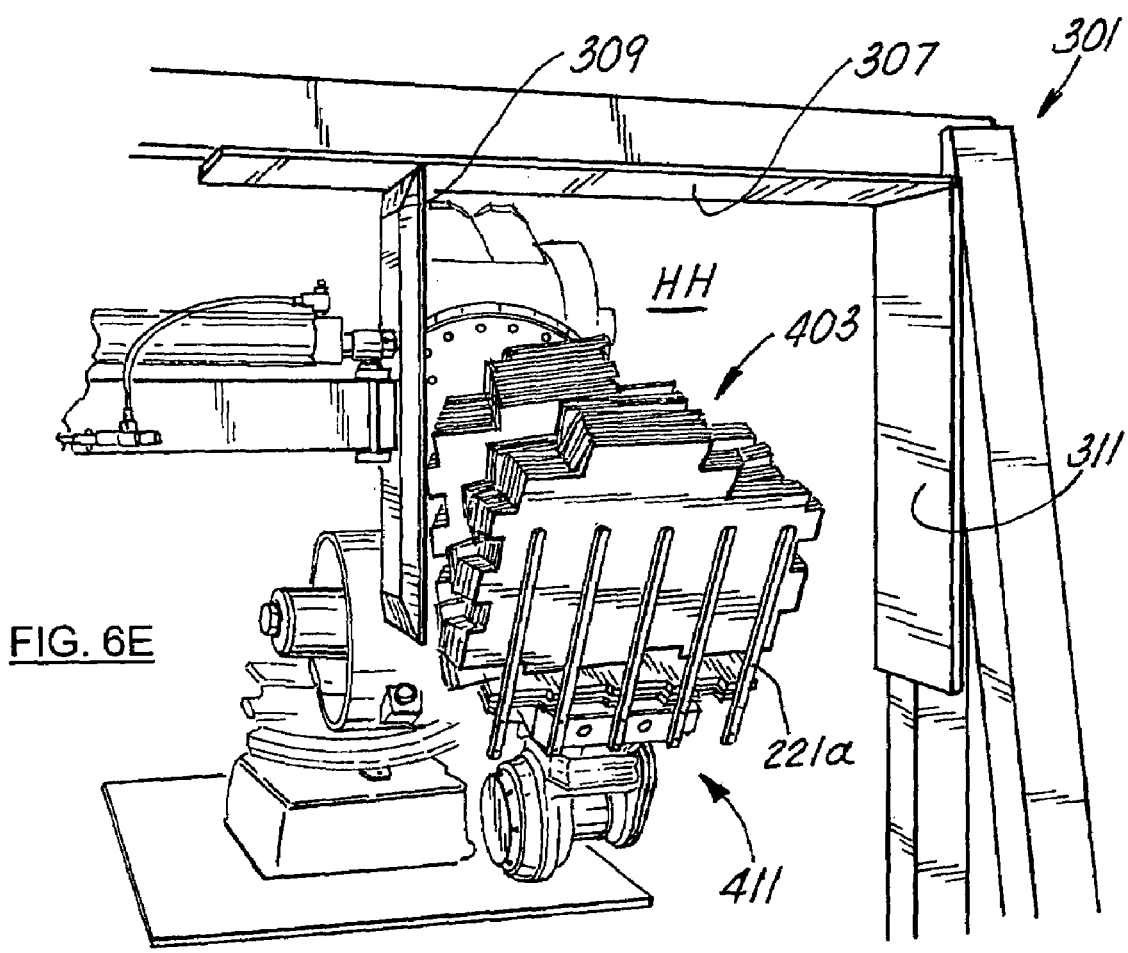
Figure 6F:
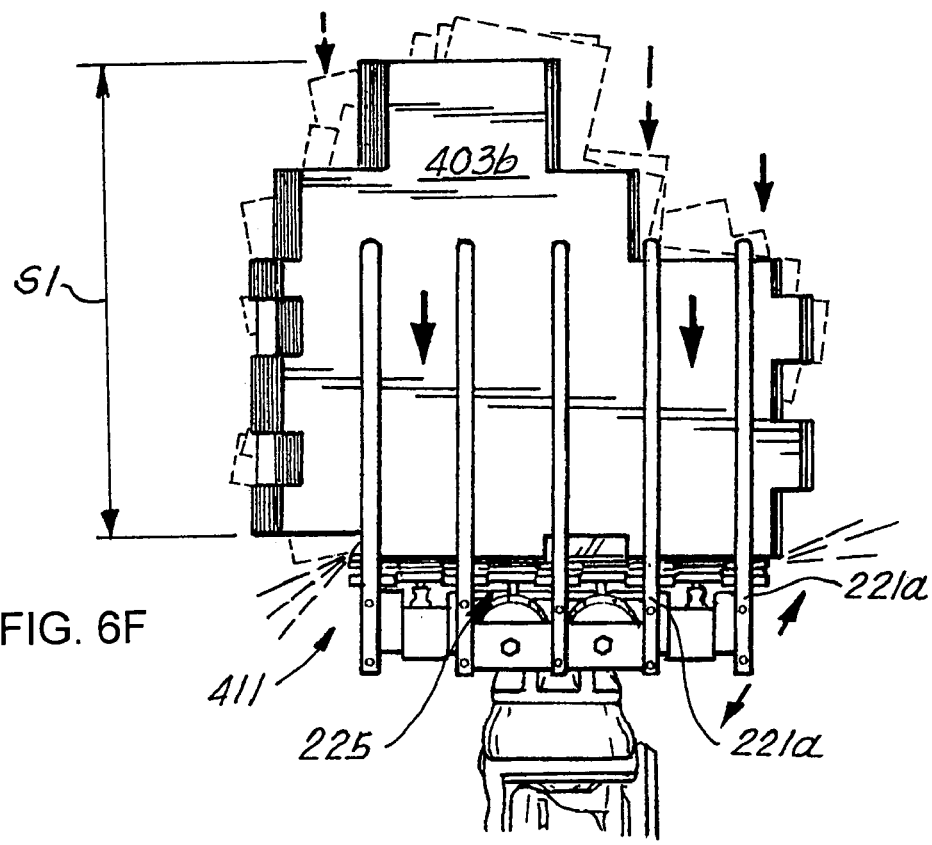
Figure 6G:
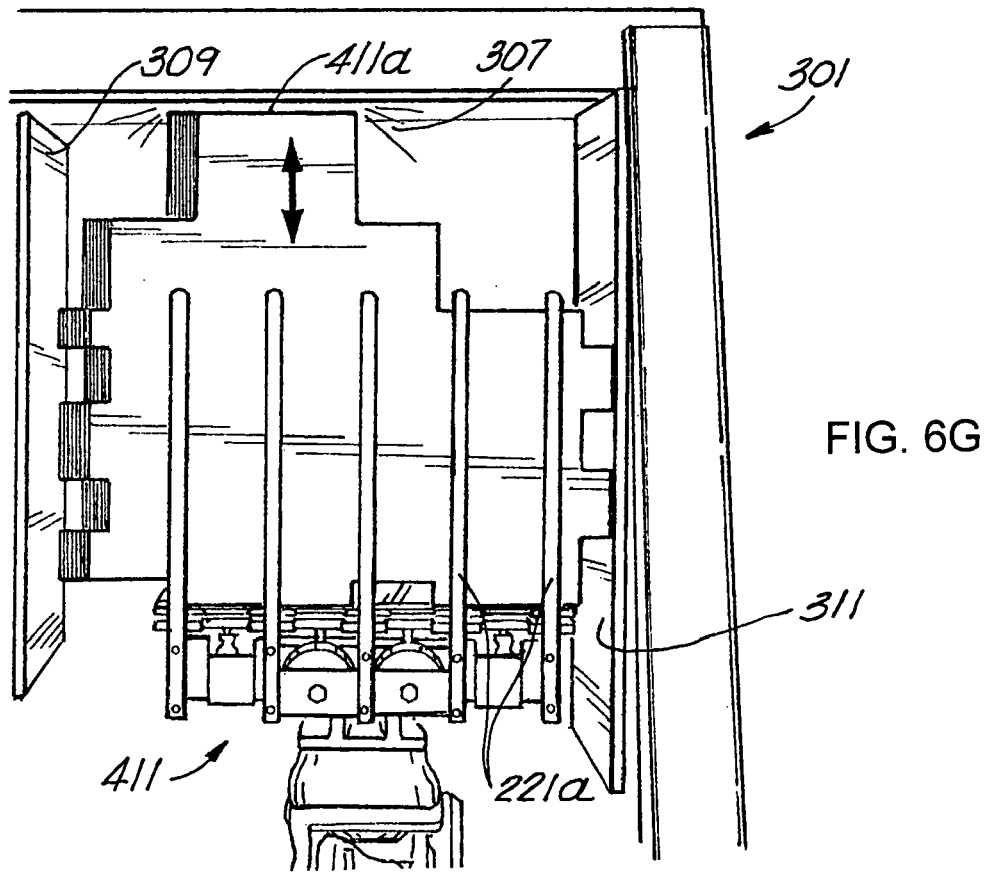

With unqualified stack 403 secured in the bay GG, robotic implement 111 is moved generally upwards to lift unqualified stack 403 from pallet 401 (FIG. 6D). Then, robotic implement 111 is rotated upwards about wrist joint 121 to the position depicted in FIG. 6D. FIG. 6E depicts the secured unqualified stack 403 being moved toward qualifying frame 301 and positioned generally in the qualifying area HH. Prior to activating qualifying frame 301, however, robotic implement 111 is preferably adjusted so that forks 221, 223 are generally vertical. The forks 221, 223 are then opened, as shown in FIG. 6F, so that carton blanks 405 fall to the floor 225.

It should be noted that in alternative methods, the forks 221, 223 may be opened to release the unqualified stack 403 after the stack 403 is lifted as shown in FIG. 6C. Then, the robotic implement 111 and the unsecured, unqualified stack 403 are rotated upwardly at a generally predetermined acceleration and path so that the stack 403 falls toward (due to gravitational force) and hits the floor 225. The desired acceleration and path may be determined through brief experimentation depending primarily on the characteristics of the stack 403 and the robotic mechanism 111 employed. In some applications, a quick rotation and abrupt stop may provide the best results. In other applications, an elliptical path of rotation may be employed in conjunction with an abrupt stop or reduction in angular velocity.

In the alternative, the secured, unqualified stack 403 may be rotated to vertical and then the fork 221, 223 opened. The carton blanks 405 will fall to the floor 225, but is preferably tossed up again one or more times by the robotic implement 111. The subsequent tosses causes the blank cartons 405 to impact the floor 225. With either alternative, the impact between the falling carton blanks 405 and the floor 225 causes right side S2 of the stack 403 to align against the floor 225 and, thereby qualify. Any method of qualifying side S1 or S3 may then be employed to qualify the stack 403.

Now returning to FIG. 6G, with the unqualified stack 403 rested or otherwise supported on the floor 225, robotic implement 111 is moved upwards so that the left side S4 of the unqualified stack 403 engages the stationary horizontal wall or plate 307 and the stack 403 is pressed between horizontal wall 307 and floor 225. In this manner, the protruding edges 411a of the carton blanks 405 straightens and align against the stationary horizontal wall 307 and against the floor 225. Robotic implement 111 may be moved up and down several time times to ensure that S2 and S4 are qualified.

Figure 6H:
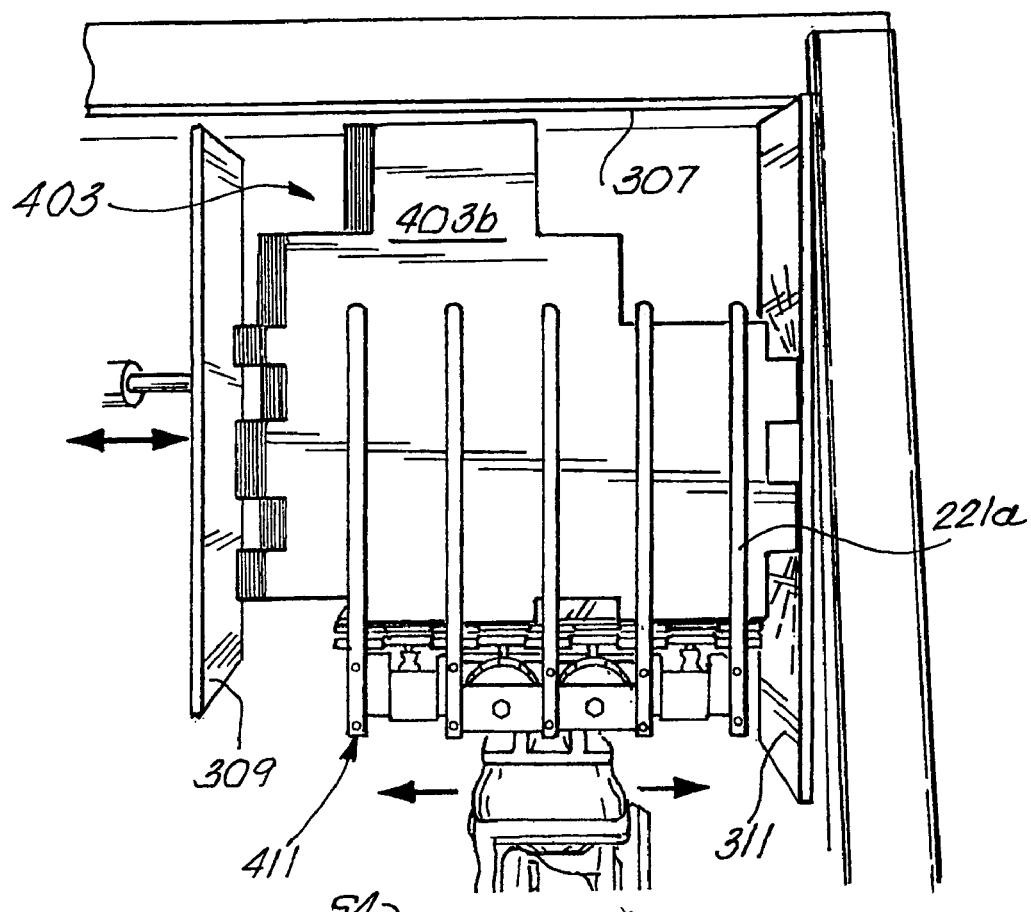
Figure 6I:
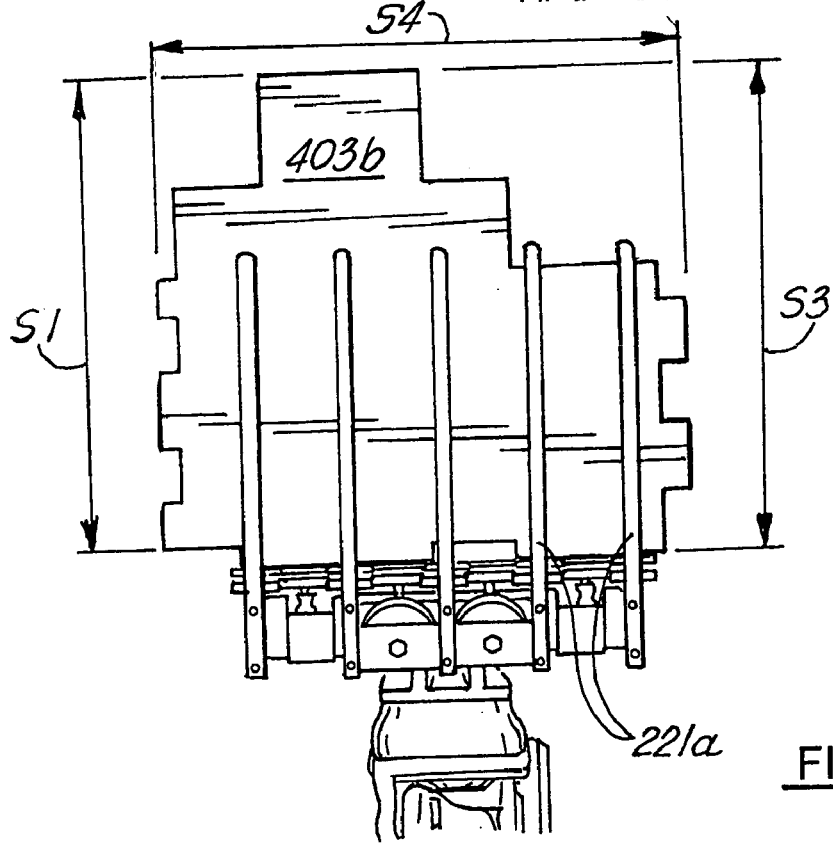

In a subsequent step illustrated by FIG. 6H, the still unqualified stack 403 is then qualified along the top or bottom sides S1, S3. Moveable vertical wall or qualifying wall 309 is moved in the direction of and in engagement with the side S1 of the unqualified stack 403. This presses the stack 403 between the vertical walls 309, 313 and aligns side S1 against the stationary vertical wall 313. The qualifying 309 may be moved back and forth a few times in the above manner to ensure that protruding edges 411a straighten and align. Completion of this step results in the unqualified stack 403 being qualified. FIG. 6I illustrates the now qualified stack 403 being moved away from the qualifying zone HH. In this step, the clamping mechanism 227 may be operated to ensure support and securement of the qualified stack 403 within the robotic implement 111.

Figure 6J:
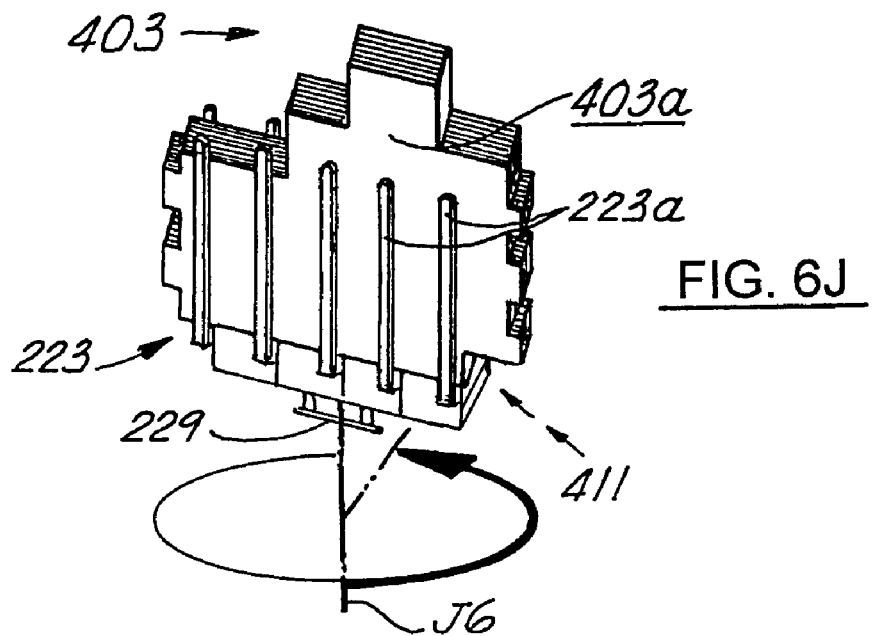
Figure 6K:
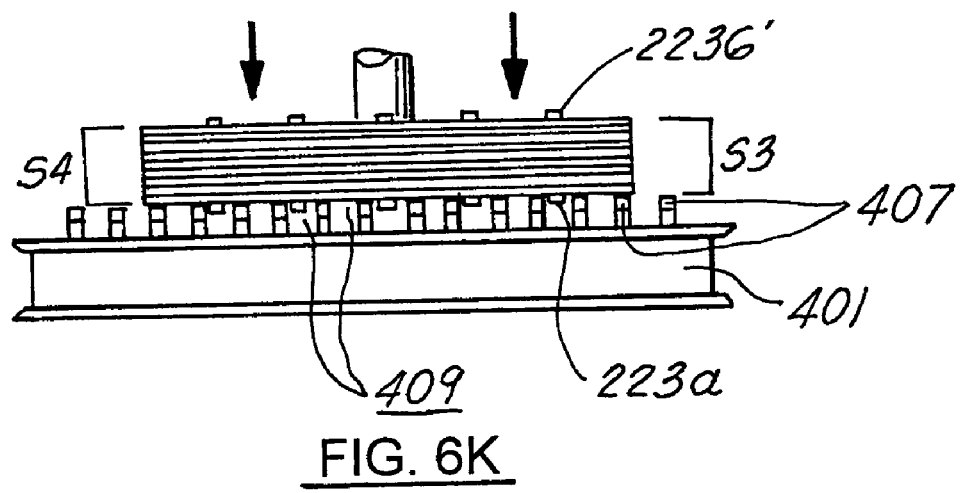
Figure 6L:
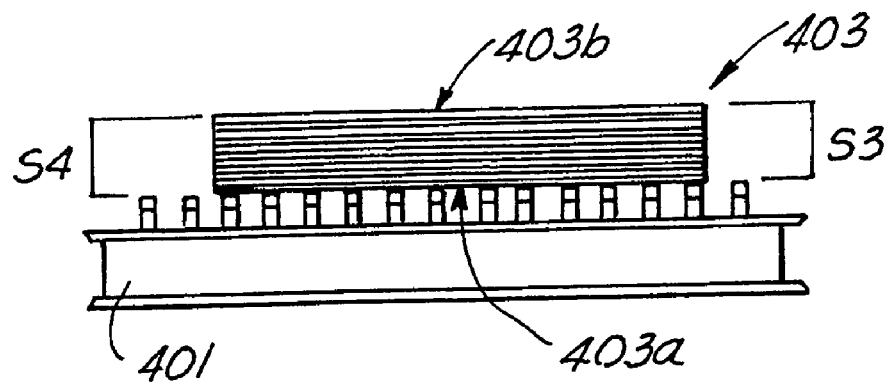

In yet another aspect of the invention, the qualified stack 403 is inverted before being returned to a pallet. FIG. 6I shows the qualified stack 403 after being moved away from qualifying zone HH. In the front view of FIG. 6I, the fork 221 (see tines 221a) and original bottom surface 403b of the stack is shown on the page and the original top surface 403a is hidden from view. In a subsequent step illustrated in FIG. 6J, robotic implement 111 and qualified stack 403 are rotated 180 degrees about vertical axis J1 and utilizing wrist flange 123. As shown in FIG. 6J, bottom surface 403b and fork 223 are rotated away from view, while top surface 403a and fork 221 are rotated to the front and into view. Subsequently, robotic implement 111 is moved over the pallet 401 and rotated downward so that fork 221 is positioned below the stack 403. Further, robotic implement 111 is positioned over or to the side of the pallet 401 such that the tines 223 of fork 223 are aligned with the grooves 409 of the pallet 401. After disengaging the clamping mechanism 227, the secured stack 403 and robotic implement 111 are lowered so that the tines 223a sink into grooves 409 and until the qualified stack 403 rests on the pallet 401, as shown in FIG. 6K Referring to FIG. 6L, the stack 403 is now qualified with each of the four sides S1–S4 vertically aligned. Moreover, what was initially the bottom surface 403b of the stack 403 is now located on the top and what was initially the top surface 403a is now on the bottom of the inverted, qualified stack 403.

Figure 7:
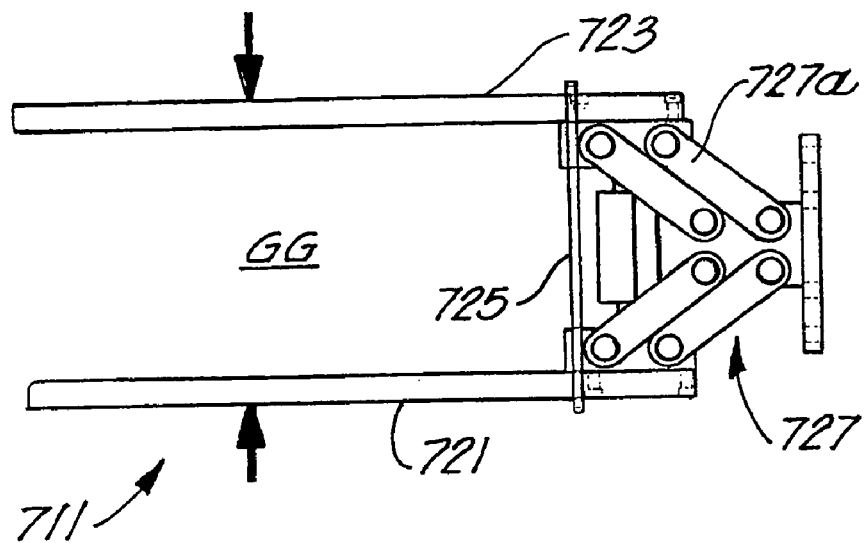
FIG. 7 is a side view of an alternative robotic implement according to the present invention.

FIG. 7 depicts an alternative robotic implement 711 according to the invention. The robotic implement 711 includes a first fork 721 or other support barrier and a second fork or support barrier 723. Moreover, the robotic implement 711 has a floor 725 extending between the forks 721, 723 and connecting therewith. In contrast with the robotic implement 111 of FIG. 2, the robotic implement 711 has a clamping mechanism 727 that mechanically guides forks 721, 723 through a set of links 727a.

In an alternative embodiment of a system according to the present invention, the qualifying frame 301 as depicted in FIG. 3, is eliminated. The function of the qualifying frame is provided by a robotic implement such as the robotic implements 811 and 911 in FIGS. 8 and 9, respectively.

Figure 8:
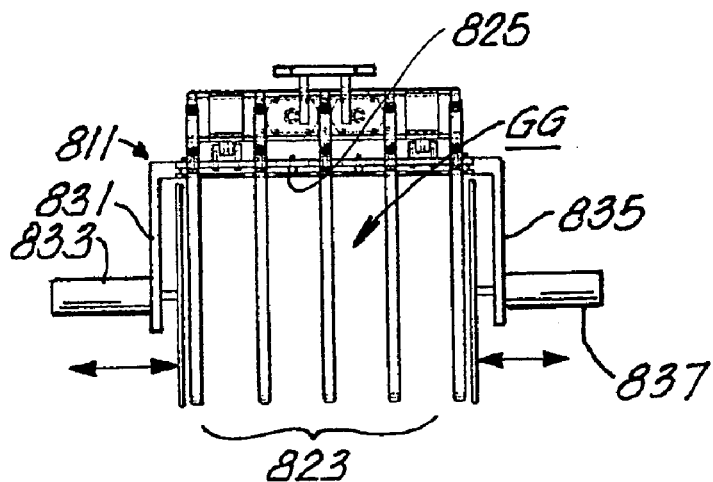
FIG. 8 is a plan view of another alternative robotic implement according to the invention.

Referring to FIG. 8, the robotic implement 811 includes a first fork 821 and a second fork 823 (obscured from view). The robotic implement 811 also includes a floor 825 extending between the two forks 821, 823 and connecting therewith. Forks 821, 823 and floor 825 define a containment bay GG in which a stack may be supported or otherwise positioned. In an alternative aspect of the invention, the robotic implement 811 is provided with a pair of moveable qualifying walls or plates 831, 835 positioned aside of forks 821, 823, and extending in the direction from floor 825 to the open section end. The robotic implement 811 also has a pair of cylinder assemblies 833, 837 operatively associated with the qualifying plates 831, 835, respectively. Through operation of cylinder 833, qualifying wall 831 is moved linearly—toward or away from forks 821, 823. Similarly, operation of cylinder 837 moves qualifying plate 835 linearly—toward or away from forks 821, 823.

Thus, robotic implement 811 provides an alternative method of qualifying a stack positioned inside the loading bay GG. The qualifying plates 831, 835 are moved inward to qualify two opposite sides (e.g., S2, S4 of the stack 403 in FIGS. 4 and 4A) of a stack positioned within the bay GG. If not already qualified, the remaining two sides S1, S3, may then be qualified in any manner described herein. For example, the robotic implement 811, with the stack 803 secured therein, may be moved into a qualifying zone of a qualifying frame and the remaining two sides S1, S3 qualified through use of an overhead, stationary or moveable horizontal plate. In another variation, the sides S1, S3 may be qualified prior to the sides S2, S4 being qualified. For example, these two sides S1, S3 may be qualified by rotating the secured stack toward a vertical position and then disengaging the clamping mechanism to allow the stack to hit the floor 825. This method and variations of this qualifying method were discussed previously.

Figure 9:
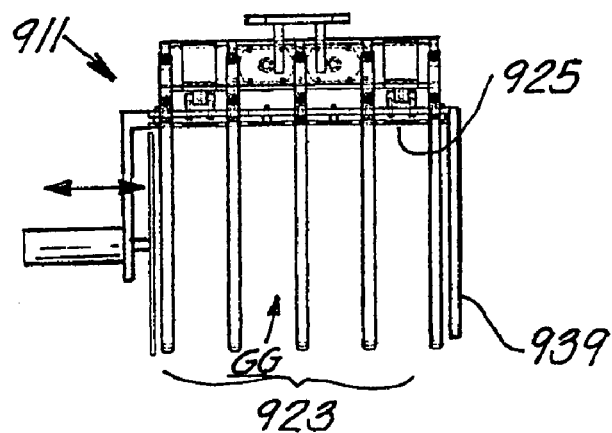
FIG. 9 is yet another alternative robotic implement according to the present invention.

In the alternative embodiment of FIG. 9, the robotic implement 911 includes one moveable qualifying wall 831 and a cylinder assembly 833 operatively associated therewith. In lieu of a second moveable plate, the robotic implement 911 is provided a stationary vertical wall 939 disposed opposite the moveable qualifying wall 931. In use, the qualifying plate 931 is moved toward an unqualified stack secured in the bay GG so that the unqualified stack is moved against the stationary qualifying wall 939. The qualifying wall 931 may be moved back and forth several times to ensure that sides S2, S4 (for example) are straightened. In this manner, sides S2, S4 of stack are qualified.

FIG. 9A depicts a variation of the robotic implement 911 in FIG. 9, in accordance with the present invention. The robotic implement 911' differs from the robotic implement 911 (and from the robotic implement 811 in FIG. 8) in that operation of the robotic implement 911' to qualify a stack does not require a moveable qualifying wall to engage the stack. The robotic implement 911' has, instead, a single stationary qualifying wall or plate 931' positioned to the side of the forks 921', 923'. Accordingly, in a method according to the invention, a stack secured within the bay GG' of robotic implement 911' is first secured by a clamping mechanism. Then, as described above, the stack is moved or rotated to a vertical position above floor 925'. From this position, the stack is then dropped so as to land on floor 925'. Next, the robotic implement 911' is rotated up to 90° such that the stack slides or falls against qualifying plate 939'. In some applications, this rotation may be performed abruptly. In other applications, this rotation may be done gradually and with some back and forth motion applied so as to slide and shake the stack into place against qualifying wall 939'. In this way, the stack is gradually moved into the corner 941' of the containment bay GG'. In this manner, the stack secured within GG' is qualified.

FIGS. 10–13 depict various alternative embodiments of a qualifying frame according to the invention, wherein like or similar reference manuals are used to denote like or similar items. In FIG. 10, the qualifying frame 1001 includes a pair of upright supports 1003 and an overhead support beam 1005 connecting therebetween. The qualifying frame 1001 also includes a moveable vertical qualifying wall 1009 operable by a cylinder assembly 1011, an opposing stationary vertical wall 1013, and an overhead moveable qualifying wall 1007 underneath overhead beam 1005. In this variation of the inventive qualifying frame 1001, the moveable qualifying wall 1007 replaces a stationary horizontal plate such as that depicted in FIG. 3. In accordance with the inventive method, an unqualified stack is moved into the qualifying zone HH and the qualifying wall 1007 engages the topmost side of the stack. By moving the wall 1007 up and down, this side and the opposite side are qualified. The remaining two sides may then be qualified using the moveable vertical qualifying wall 1009 and stationary wall 1011.

In the embodiment of FIG. 11, the qualifying frame 1101 includes a moveable vertical qualifying wall 1109 as before, and a stationary horizontal qualifying wall 1107 as before. The qualifying frame 1101 varies, however, in that a second moveable vertical qualifying wall 1113 is provided to work in conjunction with the first moveable qualifying wall 1109.

In the alternate embodiment of FIG. 12, the qualifying frame 1201 is similar to that of FIG. 11 in that the frame 1201 is provided with a first and a second moveable vertical qualifying walls 1209, 1213. The qualifying frame 1201 deviates from other designs, however, in that a moveable horizontal qualifying wall 1207 is also provided.

In the alternative embodiment of FIG. 13, the qualifying frame 1301 includes a movable horizontal qualifying wall 1307. This qualifying frame 1301 may be particularly suited for a system including the robotic implements 711 and 822 of FIGS. 7 and 8, respectively. In a method utilizing such a system, the robotic implements 711 and 811 are used to qualify one or two opposite sides of a stack. Then, the stack is moved to qualifying frame 1301 for qualification of the remaining two sides.

The selection of a qualifying frame and of a robotic implement among the embodiments described above or otherwise contemplated by the invention, may depend on several factors. One factor will be the type and characteristics of the load or stack for which the inventive system may be used. For example, stacks that are heavier, bulkier, or have a more complex configuration may warrant use of a robotic implement and/or qualifying frame incorporating multiple moveable qualifying plates (to obtain greater control). Stacks of light or very loose paper may also warrant use of multiple moveable plates on a qualifying frame or on a robotic implement.

The foregoing description of the present invention has been presented for purposes of illustration and description. It is to be noted that the description is not intended to limit the invention to the various systems, apparatus, and methods disclosed herein. Various aspects of the invention as described above, may be applicable to other types of material handling processes and equipment. For example, the robotic implement described above may be used in conjunction with other robotic mechanisms. Moreover, the method of qualifying or inverting a generally flat stack of paper, cardboard, and the like, may be employed utilizing equipment other than the particular robotic mechanism and/or robotic implement described herein. Such variations of the invention will become apparent to one skilled in the relevant material handling, robotics, or other relevant art provided with the present disclosure. Consequently, variations and modifications commensurate with the above teachings, and the skill and knowledge of the relevant art, are within the scope of the present invention. The embodiments described and illustrated herein are further intended to explain the best modes for practicing the invention, and to enable others skilled in the relevant art to utilize the invention and other embodiments and with various modifications required for the particular applications or uses of the present invention.

What is claimed is:

1. A robotic implement for attachment to a robotic mechanism such as a robotic arm, and for qualifying stacks of generally flat items, said implement comprising:
   a) a first support barrier in the form of a first multi-prong fork, said first fork being adapted for insertion into the grooves of a pallet supporting the stacks;
   b) a second support barrier in the form of a second multi-prong fork, said second fork being disposed in spaced apart relation with said first fork and adapted for insertion into the grooves of a pallet supporting the stack;
   c) a third support barrier extending generally between said first and second support barriers and defining therewith a containment bay for receiving a stack of generally flat items, wherein said containment bay has an open end section disposed opposite of said third support barrier; and
   d) a qualifying assembly operably coupled to said implement comprising:
      i) a moveable first side wall to qualify stacks positioned in said containment bay by said first and second support barriers, said first side wall being moveable toward said first and second support barriers;
      ii) a second side wall disposed opposite of said first side wall; and
      iii) a third side wall that is substantially horizontal and positioned proximate to the open end of said containment bay opposite said third support barrier;
   wherein said first and second support barriers can be positioned substantially between said side walls and said stack qualified by movement of said first side wall relative to said second side wall.

2. The robotic implement of claim 1, wherein said third side wall is moveable towards said third support barrier.

3. A robotic implement for attachment to a robotic mechanism such as a robotic arm, and for qualifying stacks of generally flat items, said implement comprising:
   a) a first support barrier in the form of a first multi-prong fork, said first fork being adapted for insertion into the grooves of a pallet supporting the stacks;
   b) a second support barrier in the form of a second multi-prong fork, said second fork being disposed in spaced apart relation with said first fork and adapted for insertion into the grooves of a pallet supporting the stack;
   c) a third support barrier extending generally between said first and second support barriers and defining therewith a containment bay for receiving a stack of generally flat items, wherein said containment bay has an open end section disposed opposite of said third support barrier; and
   d) a qualifying assembly operably coupled to said implement comprising:
      i) a moveable first side wall to qualify stacks positioned in said containment bay by said first and second support barriers, said first side wall being moveable toward said first and second support barriers;
      ii) a second side wall disposed opposite of said first side wall; and
   wherein said first and second support barriers can be positioned substantially between said side walls and said stack qualified by movement of said first side wall relative to said second side wall, and said first side wall, second side wall, or first and second side wall are at an angle that is not substantially perpendicular to said third support barrier.

4. A robotic implement for attachment to a robotic mechanism such as a robotic arm, and for qualifying stacks of generally flat items, said implement comprising:
   a) a first support barrier in the form of a first multi-prong fork, said first fork being adapted for insertion into the grooves of a pallet supporting the stacks;
   b) a second support barrier in the form of a second multi-prong fork, said second fork being disposed in spaced apart relation with said first fork and adapted for insertion into the grooves of a pallet supporting the stack;
   c) a third support barrier extending generally between said first and second support barriers and defining therewith a containment bay for receiving a stack of generally flat items, wherein said containment bay has an open end section disposed opposite of said third support barrier; and
   d) a qualifying assembly operably coupled to said implement comprising:
      i) a moveable first side wall to qualify stacks positioned in said containment bay by said first and second support barriers, said first side wall being moveable toward said first and second support barriers; and
      ii) a second side wall disposed opposite of said first side wall,
   wherein said first and second support barriers can be positioned substantially between said side walls and said stack qualified by movement of said first side wall relative to said second side wall, and said first side wall, second side wall or first and second side walls are substantially the length of the first support barrier, second support barrier, or first and second support barrier.

5. A robotic implement for attachment to a robotic mechanism such as a robotic arm, and for qualifying stacks of generally flat items, said implement comprising:
   a) a first support barrier in the form of a first multi-prong fork, said first fork being adapted for insertion into the grooves of a pallet supporting the stacks;
   b) a second support barrier in the form of a second multi-prong fork, said second fork being disposed in spaced apart relation with said first fork and adapted for insertion into the grooves of a pallet supporting the stack;
   c) a third support barrier extending generally between said first and second support barriers and defining therewith a containment bay for receiving a stack of generally flat items, wherein said containment bay has an open end section disposed opposite of said third support barrier;
   d) a wrist assembly projecting outwardly from the back of said third support barrier, said wrist assembly rotatable about a longitudinal axis and a perpendicular axis relative to the plane of said third support barrier, said wrist assembly being adapted for connection with the robotic mechanism; and
   e) a qualifying assembly operably coupled to said implement comprising:
      i) a moveable first side wall to qualify stacks positioned in said containment bay by said first and second support barriers, said first side wall being moveable toward said first and second support barriers;

ii) a second side wall disposed opposite of said first side wall, and iii) a third side wall that is substantially horizontal and positioned proximate to the open end of said containment bay opposite said third support barrier;

wherein said first and second support barriers can be positioned substantially between said side walls and said stack qualified by movement of said first side wall relative to said second side wall.

6. The robotic implement of claim 5, wherein said qualifying wall is moveable towards said third support barrier.

7. A robotic implement for attachment to a robotic mechanism such as a robotic arm, and for qualifying stacks of generally flat items, said implement comprising:

a) a first support barrier in the form of a first multi-prong fork, said first fork being adapted for insertion into the grooves of a pallet supporting the stacks;

b) a second support barrier in the form of a second multi-prong fork, said second fork being disposed in spaced apart relation with said first fork and adapted for insertion into the grooves of a pallet supporting the stack;

c) a third support barrier extending generally between said first and second support barriers and defining therewith a containment bay for receiving a stack of generally flat items, wherein said containment bay has an open end section disposed opposite of said third support barrier;

d) a wrist assembly projecting outwardly from the back of said third support barrier, said wrist assembly rotatable about a longitudinal axis and a perpendicular axis relative to the plane of said third support barrier, said wrist assembly being adapted for connection with the robotic mechanism; and e) a qualifying assembly operably coupled to said implement comprising:

i) a moveable first side wall to qualify stacks positioned in said containment bay by said first and second support barriers, said first side wall being moveable toward said first and second support barriers; and ii) a second side wall disposed opposite of said first side wall;

wherein said first and second support barriers can be positioned substantially between said side walls and said stack qualified by movement of said first side wall relative to said second side wall, and said first side wall, second side wall, or first and second side wall are at an angle that is not substantially perpendicular or substantially parallel to said third support barrier.

8. A robotic implement for attachment to a robotic mechanism such as a robotic arm, and for qualifying stacks of generally flat items, said implement comprising:

a) a first support barrier in the form of a first multi-prong fork, said first fork being adapted for insertion into the grooves of a pallet supporting the stacks;

b) a second support barrier in the form of a second multi-prong fork, said second fork being disposed in spaced apart relation with said first fork and adapted for insertion into the grooves of a pallet supporting the stack;

c) a third support barrier extending generally between said first and second support barriers and defining therewith a containment bay for receiving a stack of generally flat items, wherein said containment bay has an open end section disposed opposite of said third support barrier;

d) a wrist assembly Projecting outwardly from the back of said third support barrier, said wrist assembly rotatable about a longitudinal axis and a perpendicular axis relative to the plane of said third support barrier, said wrist assembly being adapted for connection with the robotic mechanism; and e) a qualifying assembly operably coupled to said implement comprising:

i) a moveable first side wall to qualify stacks positioned in said containment bay by said first and second support barriers, said first side wall being moveable toward said first and second support barriers;

ii) a second side wall disposed opposite of said first side wall, and wherein said first and second support barriers can be positioned substantially between said side walls and said stack qualified by movement of said first side wall relative to said second side wall, and said first side wall, second side wall or first and second side walls are substantially the length of the first support barrier, second support barrier, or first and second support barrier.

9. A robotic implement for attachment to a robotic mechanism such as a robotic arm, and for qualifying stacks of generally flat items, said implement comprising:

a) a first support barrier in the form of a first multi-prong fork;

b) a second support barrier, said second barrier being disposed in spaced apart relation with said first fork;

c) a third support barrier extending generally between said first and second support barriers and defining therewith a containment bay for receiving a stack of generally flat items, wherein said containment bay has an open end section disposed opposite of said third support barrier; and d) a qualifying assembly operably coupled to said implement comprising:

i) a moveable first side wall to qualify stacks positioned in said containment bay by said first and second support barriers, said first side wall being moveable toward said first and second support barriers; and ii) a second side wall disposed opposite of said first side wall, wherein said first and second support barriers can be positioned substantially between said side walls and said stack qualified by movement of said first side wall relative to said second side wall, and said first side wall, second side wall or first and second side walls are substantially the length of the first support barrier, second support barrier, or first and second support barrier.

10. A robotic implement for attachment to a robotic mechanism such as a robotic arm, and for qualifying stacks of generally flat items, said implement comprising:

a) a first support barrier in the form of a first multi-prong fork;

b) a second support barrier, said second barrier being disposed in spaced apart relation with said first fork;

c) a third support barrier extending generally between said first and second support barriers and defining therewith a containment bay for receiving a stack of generally flat items, wherein said containment bay has an open end section disposed opposite of said third support barrier; and d) a qualifying assembly operably coupled to said implement comprising:

i) a moveable first side wall to qualify stacks positioned in said containment bay by said first and second support barriers, said first side wall being moveable toward said first and second support barriers;
  ii) a second side wall disposed opposite of said first side wall; and
  iii) a third side wall that is substantially horizontal and positioned proximate to the open end of said containment bay opposite said third support barrier,
  wherein said first and second support barriers can be positioned substantially between said side walls and said stack qualified by movement of said first side wall relative to said second side wall.

11. The robotic implement of claim 10, wherein said third side wall is moveable towards said third support barrier.

12. A robotic implement for attachment to a robotic mechanism such as a robotic arm, and for qualifying stacks of generally flat items, said implement comprising:
  a) a first support barrier in the form of a first multi-prong fork;
  b) a second support barrier, said second barrier being disposed in spaced apart relation with said first fork;
  c) a third support barrier extending generally between said first and second support barriers and defining therewith a containment bay for receiving a stack of generally flat items, wherein said containment bay has an open end section disposed opposite of said third support barrier; and
  d) a qualifying assembly operably coupled to said implement comprising:
    i) a moveable first side wall to qualify stacks positioned in said containment bay by said first and second support barriers, said first side wall being moveable toward said first and second support barriers; and
    ii) a second side wall disposed opposite of said first side wall;
  wherein said first and second support barriers can be positioned substantially between said side walls and said stack qualified by movement of said first side wall relative to said second side wall, and said first side wall, second side wall, or first and second side wall are at an angle that is not substantially perpendicular to said third support barrier.

13. A robotic implement for attachment to a robotic mechanism such as a robotic arm, and for qualifying stacks of generally flat items, said implement comprising:
  a) a first support barrier in the form of a first multi-prong fork;
  b) a second support barrier, said second barrier being disposed in spaced apart relation with said first fork;
  c) a third support barrier extending generally between said first and second support barriers and defining therewith a containment bay for receiving a stack of generally flat items, wherein said containment bay has an open end section disposed opposite of said third support barrier;
  d) a wrist assembly projecting outwardly from the back of said third support barrier, said wrist assembly rotatable about a longitudinal axis and a perpendicular axis relative to the plane of said third support barrier, said wrist assembly being adapted for connection with the robotic mechanism; and
  e) a qualifying assembly operably coupled to said implement comprising:
    i) a moveable first side wall to qualify stacks positioned in said containment bay by said first and second support barriers, said first side wall being moveable toward said first and second support barriers;
    ii) a second side wall disposed opposite of said first side wall; and
    iii) a third side wall that is substantially horizontal and positioned proximate to the open end of said containment bay opposite said third support barrier,
  wherein said first and second support barriers can be positioned substantially between said side walls and said stack qualified by movement of said first side wall relative to said second side wall.

14. The robotic implement of claim 13, wherein said qualifying wall is moveable towards said third support barrier.

15. A robotic implement for attachment to a robotic mechanism such as a robotic arm, and for qualifying stacks of generally flat items, said implement comprising:
  a) a first support barrier in the form of a first multi-prong fork;
  b) a second support barrier, said second barrier being disposed in spaced apart relation with said first fork;
  c) a third support barrier extending generally between said first and second support barriers and defining therewith a containment bay for receiving a stack of generally flat items, wherein said containment bay has an open end section disposed opposite of said third support barrier;
  d) a wrist assembly projecting outwardly from the back of said third support barrier, said wrist assembly rotatable about a longitudinal axis and a perpendicular axis relative to the plane of said third support barrier, said wrist assembly being adapted for connection with the robotic mechanism; and
  e) a qualifying assembly operably coupled to said implement comprising:
    i) a moveable first side wall to qualify stacks positioned in said containment bay by said first and second support barriers, said first side wall being moveable toward said first and second support barriers; and
    ii) a second side wall disposed opposite of said first side wall,
  wherein said first and second support barriers can be positioned substantially between said side walls and said stack qualified by movement of said first side wall relative to said second side wall, and said first side wall, second side wall, or first and second side wall are at an angle that is not substantially perpendicular or substantially parallel to said third support barrier.

16. A robotic implement for attachment to a robotic mechanism such as a robotic arm, and for qualifying stacks of generally flat items, said implement comprising:
  a) a first support barrier in the form of a first multi-prong fork;
  b) a second support barrier, said second barrier being disposed in spaced apart relation with said first fork;
  c) a third support barrier extending generally between said first and second support barriers and defining therewith a containment bay for receiving a stack of generally flat items, wherein said containment bay has an open end section disposed opposite of said third support barrier;
  d) a wrist assembly projecting outwardly from the back of said third support barrier, said wrist assembly rotatable about a longitudinal axis and a perpendicular axis relative to the plane of said third support barrier, said wrist assembly being adapted for connection with the robotic mechanism; and
  e) a qualifying assembly operably coupled to said implement comprising:
    i) a moveable first side wall to qualify stacks positioned in said containment bay by said first and second support barriers, said first side wall being moveable toward said first and second support barriers; and ii) a second side wall disposed opposite of said first side wall, wherein said first and second support barriers can be positioned substantially between said side walls and said stack qualified by movement of said first side wall relative to said second side wall, and said first side wall, second side wall or first and second side walls are substantially the length of the first support barrier, second support barrier, or first and second support barrier.

17. A robotic implement for attachment to a robotic mechanism, and for qualifying stacks of generally flat items, said implement comprising:

a) a first support barrier in the form of a first multi-prong fork, said first fork being adapted for insertion into the grooves of a pallet supporting the stacks;

b) a second support barrier in the form of a second multi-prong fork, said second fork being disposed in spaced apart relation with said first fork and adapted for insertion into the grooves of a pallet supporting the stack;

c) a third support barrier extending generally between said first and second support barriers and defining therewith a containment bay for receiving and supporting a stack of generally flat items, wherein said containment bay has an open end section disposed opposite of said third support barrier;

d) an articulated joint projecting outwardly from said third support barrier, said joint having a longitudinal axis extending substantially normal through said third support barrier, said joint being adapted for connection with the robotic mechanism; and e) a qualifying assembly operably coupled to said implement comprising:

i) a moveable first side wall to qualify stacks positioned in said containment bay by said first and second support barriers, said first side wall being moveable toward said first and second support barriers; and ii) a second side wall disposed opposite of said first side wall;

wherein said first and second support barriers can be positioned substantially between said side walls and said stack qualified by movement of said first side wall relative to said second side wall.

* * * * *